United States Patent
Kazmi (10) Patent No.: US 10,095,680 B1
(45) Date of Patent: Oct. 9, 2018

(54) SYSTEMS AND METHODS FOR REDUCED MEMORY USAGE WHEN PROCESSING SPREADSHEET FILES

(71) Applicant: ServiceNow, Inc., Santa Clara, CA (US)

(72) Inventor: Azfar Kazmi, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 219 days.

(21) Appl. No.: 15/138,369

(22) Filed: Apr. 26, 2016

(51) Int. Cl.
  *G06F 17/00* (2006.01)
  *G06F 17/30* (2006.01)
  *G06F 17/24* (2006.01)

(52) U.S. Cl.
  CPC ...... *G06F 17/246* (2013.01); *G06F 17/30321* (2013.01); *G06F 17/30923* (2013.01)

(58) Field of Classification Search
  None
  See application file for complete search history.

(56) References Cited

U.S. PATENT DOCUMENTS

| | | | |
|---|---|---|---|
| 2006/0136433 A1* | 6/2006 | Rothschiller | G06F 17/2247 |
| 2008/0300850 A1* | 12/2008 | Chen | G06F 17/218 |
| | | | 703/22 |
| 2011/0197118 A1* | 8/2011 | Williamson | G06F 17/211 |
| | | | 715/217 |

OTHER PUBLICATIONS

Daniel Rent, "OpenOffice.org's Documentation of the Microsoft Excel File Format Excel Versions 2, 3, 4, 5, 95, 97, 2000, XP, 2003", Apr. 2, 2008, revision 1.42, pp. 1-250.*
Oliver, A.C.., et al.; "Apache POI—The Java API for Microsoft Documents", downloaded Jan. 16, 2016, 2 pp.
*Array Index* vs. *String CharAt, jsPerf*, downloaded Jan. 16, 2016, 4 pp.
Price, John; "File APIs for Java Developers", Manipulate DOC, XLS, PPT, PDF and many others from your application, Converting String to ArrayList, downloaded Jan. 16, 2016, 9 pp.
Tutorials Point, "Java—Strings", http://www.tutorialspoint.com/java/java_strings.html, downloaded Jan. 18, 2016, 7 pp.
Tutorials Point, "Java—The ArrayList Class", downloaded Jan. 16, 2016, 5 pp.
Codingbat, "Code Practice", Java String IndexOf Parsing, http://codingbat.com/doc/java-string-indexof-parsing.html, downloaded Jan. 18, 2016, 4 pp.

(Continued)

*Primary Examiner* — Ariel Mercado
(74) *Attorney, Agent, or Firm* — Fletcher Yoder PC (57) ABSTRACT

A method and associated apparatus provide for accessing contents of a worksheet file comprising a worksheet structure file and a shared strings table file. The method comprises processing the shared strings table file by opening the shared strings table file, and identifying a plurality of shared strings within the opened shared strings table file, and, for each shared string, creating an access record in an access table comprising a shared string identifier, a starting offset into a shared string text file, and a length, and retrieving data for a requested cell by obtaining a requested cell shared string identifier from the worksheet structure file, locating a requested cell access record in the access table, retrieving a requested cell string from the shared string text file at a position indicated by the starting offset and for a length indicated by the record length, and outputting the retrieved string.

18 Claims, 5 Drawing Sheets

(56) References Cited

OTHER PUBLICATIONS

Oliver, A.C., et al.; "POI-HSSF and POI-XSSF—Java API to Access Microsoft Excel Format Files", downloaded Jan. 16, 2016, 2 pp.
Programmers Stack Exchange, "Settle an Argument: String vs. Array?", downloaded Jan. 16, 2016, 4 pp.
Stack Overflow, "Java—Would an ArrayList<String> or an String[] array be better in this case", downloaded Jan. 16, 2016, 3 pp.
The New Halloween Document, "How to Use the HSSF API", downloaded Jan. 16, 2016, 9 pp.

\* cited by examiner

SYSTEMS AND METHODS FOR REDUCED MEMORY USAGE WHEN PROCESSING SPREADSHEET FILES

TECHNICAL FIELD

The present disclosure relates in general to techniques and devices for processing information contained in data files having multiple components to minimize the impact on memory usage for files with large components, for example, spreadsheet or worksheet data files.

BACKGROUND

The processing of spreadsheet (alternatively referred to as "worksheet") information can include operations of opening a spreadsheet file, reading content of cells, performing operations or processing on the content of cells, and saving results of the operations or processing.

One possible unit of organization in a worksheet is the addressable cell. A worksheet may be comprised of a two-dimensional array of cells that are formed into rows and columns, where the position within the row and column provides the address of a cell. A spreadsheet file, or workbook, can contain a plurality of worksheets.

Although cells can contain data that is isolated, i.e., is not related to any other cell, the spreadsheet can also relate information from one cell with that of another. Thus, the processing of spreadsheet data in a normal case involves accessing data from other cells in order to process the data of a particular cell of focus. For large spreadsheets, however, the amount of data may be large, and a significant amount of memory has typically utilized in order to process large spreadsheets.

SUMMARY

In an implementation, an apparatus is provided for accessing contents of a worksheet file and containing at least one cell having associated data, comprising a processor, and a memory accessible by the processor and comprising the worksheet file and a worksheet processing module, wherein the worksheet file comprises a plurality of formatted files that comprise a worksheet structure file that includes information for one or more cells, and a shared strings table file that contains shared string information associated with one or more cells of worksheet, and the worksheet processing module comprises instructions that process the shared strings table file by executing instructions that opens the shared strings table file, and identifies a plurality of shared strings within the opened shared strings table file, and, for each of the plurality of shared strings, creating an access record in an access table comprising: a shared string identifier, a starting offset into a shared string text file stored on a non-volatile hardware disk device, and a length, and retrieve data for a requested cell by executing instructions that obtain a requested cell shared string identifier from the worksheet structure file, locate a requested cell access record in the access table based on a requested cell shared string identifier, and retrieve a requested cell string from the shared string text file at a position indicated by the requested cell access record starting offset and for a length indicated by the requested cell access record length, and output the retrieved requested cell string.

In a further implementation, a method is provided for accessing contents of a worksheet file stored on a non-volatile memory device and containing at least one cell having associated data, wherein the worksheet file comprises a plurality of formatted files that comprise a worksheet structure file that includes information for one or more cells, a shared strings table file that contains shared string information associated with one or more cells of worksheet, and the method comprising processing the shared strings table file by opening the shared strings table file, and identifying a plurality of shared strings within the opened shared strings table file, and, for each of the plurality of shared strings, creating an access record in an access table comprising: a shared string identifier, a starting offset into a shared string text file stored on a non-volatile hardware disk device, and a length, and retrieving data for a requested cell by obtaining a requested cell shared string identifier from the worksheet structure file, locating a requested cell access record in the access table based on a requested cell shared string identifier, retrieving a requested cell string from the shared string text file at a position indicated by the requested cell access record starting offset and for a length indicated by the requested cell access record length, and outputting the retrieved requested cell string.

In a further implementation, a non-transitory computer-readable storage medium is provided that comprises executable instructions that, when executed by a processor, facilitate performance of operations described in the method above.

BRIEF DESCRIPTION OF THE DRAWINGS

The description herein makes reference to the accompanying drawings wherein like reference numerals refer to like parts throughout the several views.

DETAILED DESCRIPTION

Spreadsheets are a popular tool for organizing and performing operations data. As described above, they typically comprise a two-dimensional grid of addressable cells organized into rows and columns. The spreadsheet was recognized even in its beginnings as a very powerful tool, and has undergone significant advances over the decades.

The spreadsheet application that is currently the industry standard is MICROSOFT EXCEL (although Open Source and cloud-based variants are becoming increasingly popular).

Given the significant amount of information stored in formatted files, such as EXCEL formatted spreadsheet files, it is desirable to provide a simple programmatic interface to access and manipulate data stored in these formatted files, without requiring the actual spreadsheet (e.g., Excel) program file.

The format of MICROSOFT's EXCEL file format has evolved over the years, from a proprietary format ("Excel '97" and earlier) to what is now called the Office Open XML (OOXML) format (standardized to become ECMA-376, approved in December 2006) ("Excel 2007" (and later)), which has generally sought to be in compliance with ISO/IEC 29500:2008 (variations in the strictness of compliance are found in the most recent decade of MICROSOFT's releases of EXCEL). The OOXML format, which will be referred to below by the file's accepted extension "an XLSX file," is generally a zipped version of XML-formatted files defining the structure and data within the spreadsheet (or technically, the workbook, which may comprise a plurality of spreadsheets).

Although the XLSX and underlying XML files are standard formats for use with current versions of MICROSOFT EXCEL, files utilizing other formats, such as a comma separated values (CSV) format, older versions of MICROSOFT EXCEL files XLS, etc. are also contemplated by the implementations discussed herein. As defined herein, the term "formatted file" incorporates any workbook structured file having multiple components where one component references another.

Existing utilities and libraries provide a programmatic interface for working with and even streaming formatted files, such as XLSX files. However, use of these libraries can require a significant amount of expensive RAM, particularly due to the fact that the shared strings table, is entirely loaded into RAM before accessing (including streaming) of the spreadsheet data can take place. It is desirable to utilize less expensive disk storage, provided performance is not degraded too much.

Implementations of the invention are discussed in more detail below, focusing on an implementation using the XLSX formatted files. However, the invention is not limited to XLSX files and may be applied to any workbook formatted file. A general structure of a computer network and cloud computing, as well as a general structure of a computer within this network, on which the implementations may be run is initially discussed prior to the specifics of the implementations themselves.

Figure 1:
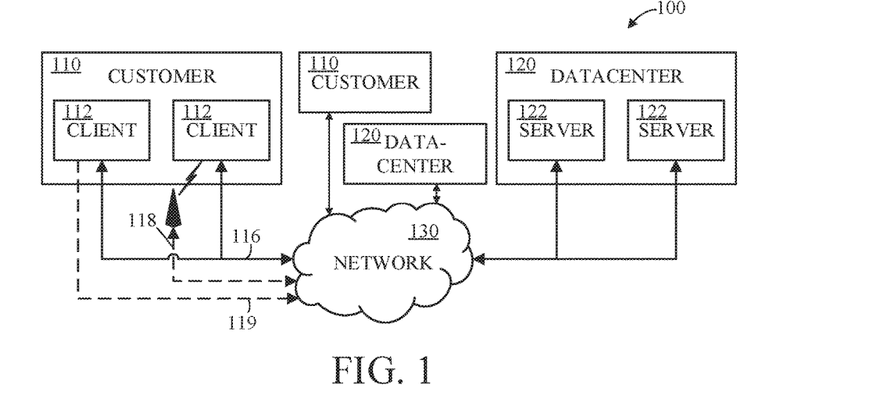
FIG. 1 is a block diagram of a networked distributed or cloud computing system in which the teachings herein may be implemented.

FIG. 1 is a block diagram of a distributed (e.g., client-server, networked, or cloud) computing system 100. The phrase "cloud computing system" as used herein includes any form of a distributed computing system, and this phrase is used simply for ease of reference. Cloud computing system 100 can have any number of customers, including customer 110. Each customer 110 may have clients, such as clients 112. Each of clients 112 can be in the form of a computing system comprising multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g., a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
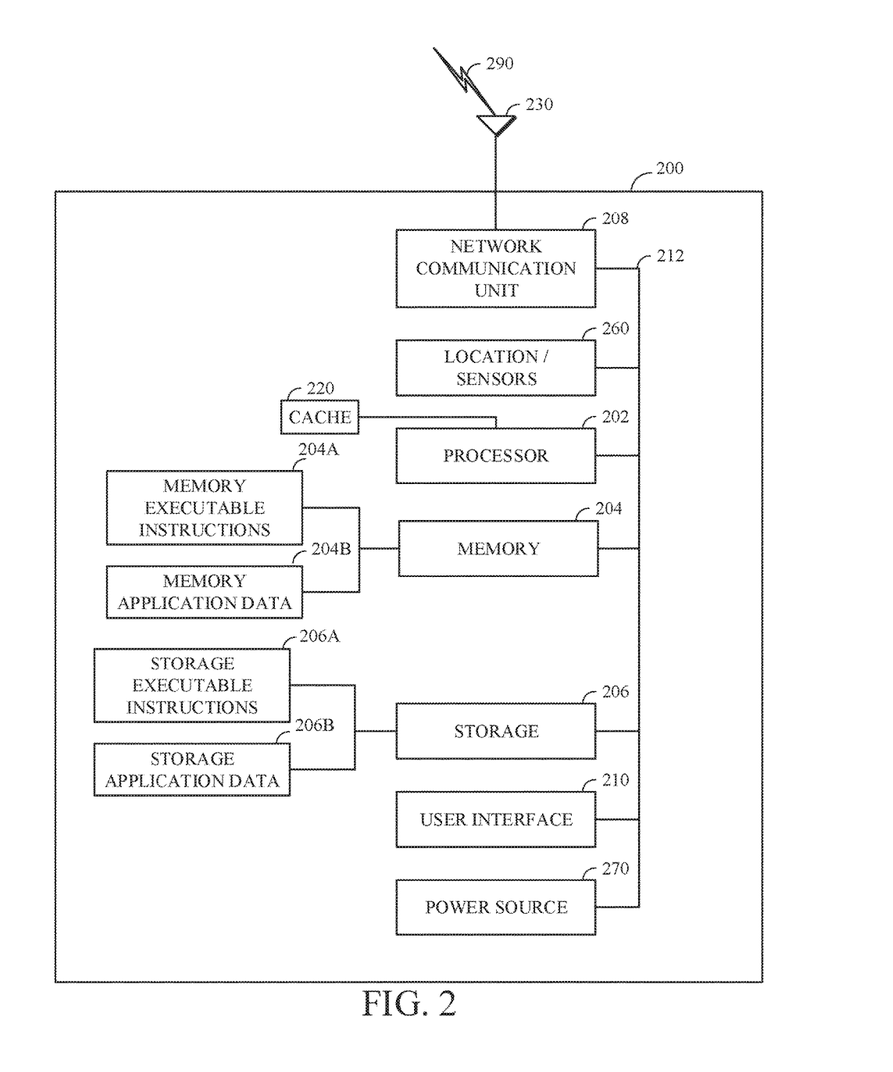
FIG. 2 is a block diagram of an example internal configuration of a computing device, such as a computing device of the computing system as shown in FIG. 1.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can comprise a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically includes one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. A disk device, as defined herein, can be an actual disk drive or other forms of storage devices designed to be accessed in a manner similar to an actual disk drive (e.g., flash cards and solid-state disk drives, and the like). Storage 206 can comprise executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a MICROSOFT WINDOWS, MAC OS X, or LINUX, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 comprises instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can include one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or comprises a display, the display can be implemented in various ways, including by a liquid crystal display (LCD) or a cathode-ray tube (CRT) or light emitting diode (LED) display, such as an OLED display. A structured output of a device can be provided to an input of the display so that the elements provided on the display screen represent the underlying structure of the output data.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
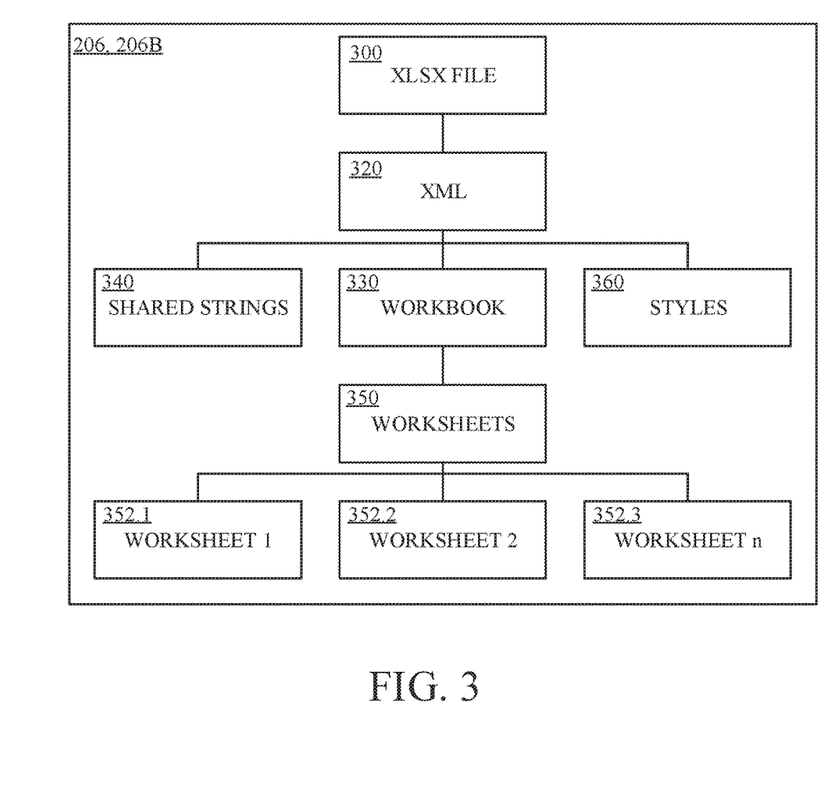
FIG. 3 is a block diagram illustrating an implementation using an XLSX-formatted file structure.

As noted above, various implementations of the invention may be run on the computing devices 200 described above and within the context of a networked computing system 100. An example of a worksheet file as a formatted file, according to an implementation, is an XLSX file (Excel 2007) 300 is illustrated by FIG. 3, which is a block diagram illustrating the XLSX-formatted file structure stored within the storage 206, 206B. The worksheet file 300 comprises formatted files that are compressed XML-formatted data 320, which is itself comprised of the workbook 330, shared strings 340, styles 360, and worksheets 350, such as the plurality of individual worksheets 352.1, 352.2, and 352.3 (collectively or individually by way of example, 352) illustrated in FIG. 3. As used herein, a formatted file within the worksheet file includes any component or resources and is not limited to the notion of a file stored in a filesystem.

The worksheets 352 contain the actual structure of the sheets. However, the shared strings 340 storage contains unique instances of strings that may be used throughout the entire workbook. For a large spreadsheet, the shared strings 340 may constitute a significant percentage of the size of the file 300.

When processing large files, two different approaches may be taken. In a first approach, the entire file is input, processed, and then output. However, such an approach requires a large amount of costly memory to hold all of the data contained within the file before outputting it to a less expensive media, such as disk storage.

In a second approach, called "streaming," only portions of the large file are input, processed, and output at a time, so that processed data can initially be received more quickly, and, more importantly, so that less of the expensive memory needs to be used when buffering the input and performing the processing. The data is acted upon as it is encountered via the input.

Implementations that stream a sheet in the XSLX file still suffer from the use of excessive memory because of the shared strings file. When this is done, even though streaming routines are used, the code may utilize a significant amount of memory because the shared strings table is loaded in its entirety into memory. As noted above, these unique strings may constitute the bulk of a spreadsheet file, particularly when cell values are long and unique (e.g., containing lengthy text, such as working notes). Since memory is a relatively expensive storage medium, it is desirable to minimize the amount used when processing large data files, such as the spreadsheets described herein.

In order to prevent such a large amount of memory from being used by loading the entire shared strings table into memory, according to an implementation, the strings table data is seamlessly stored on disk to avoid using a significant amount of memory. The data is provided to the existing spreadsheet library routines on demand, and thus, the process is seamless to the execution of these routines.

Figure 4:
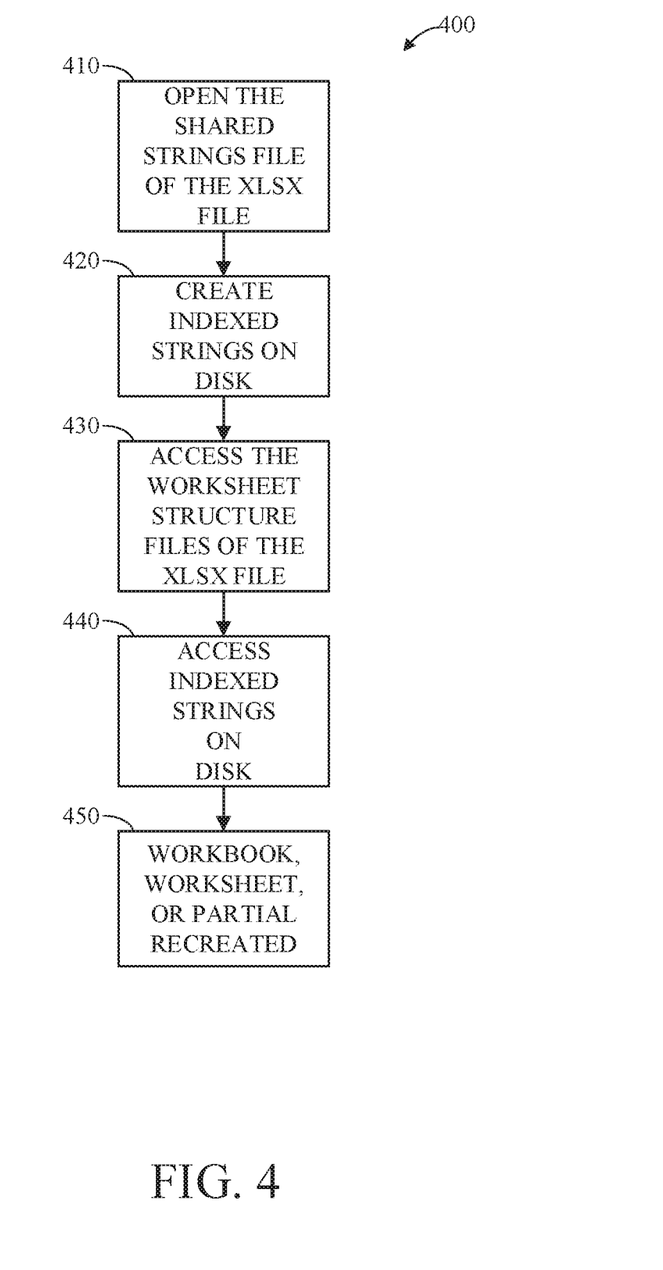
FIG. 4 is a flowchart illustrating the accessing of an XLSX-formatted file.
Figure 7:
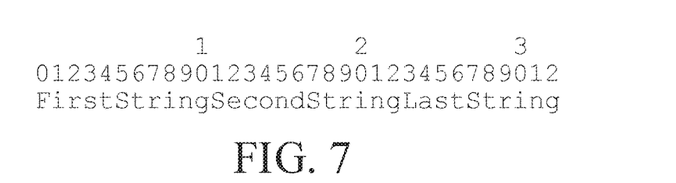
FIG. 7 is a text file layout with illustrative byte position numbering.
Figure 8:
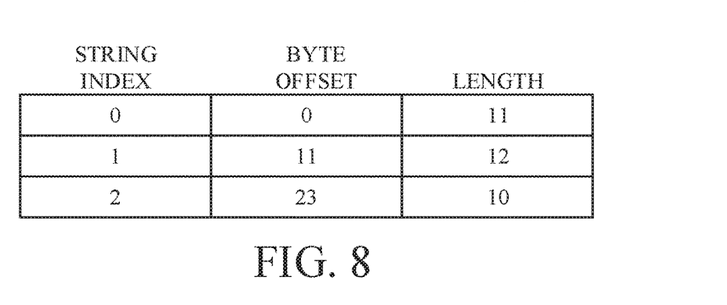
FIG. 8 is a layout of a string index table.

FIG. 4 is a flowchart 400 illustrating the accessing of an XLSX-formatted file. The flowcharted process may be run as a disk-based worksheet processing module containing instructions 206A executable by the processor 202 and stored in the computer memory/storage 206. This flowchart will be discussed in conjunction with FIG. 5, which is a pictorial diagram of a spreadsheet, FIG. 6, which is an XML file format for the shared strings table, FIG. 7, which is a text file layout with illustrative byte position numbering, and FIG. 8 is a layout of a string index table.

Figure 5:
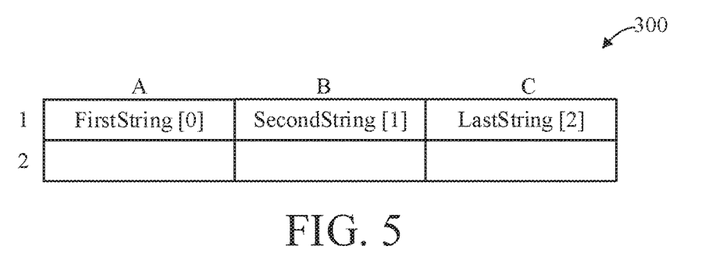
FIG. 5 is a pictorial diagram of a spreadsheet.

Turning to FIG. 4, the process 400 begins with a processing of the shared strings file 340 which is initiated by the operation of opening 410 the shared strings file 340 portion of the XLSX file 300. FIG. 5 illustrates an example spreadsheet containing three strings. The cell A:1 contains a string "FirstString" that is eleven bytes long, the cell A:2 contains a string "SecondString" that is twelve bytes long, and the cell A:3 contains a string "LastString" that is ten bytes long. The bracketed "[<#>]" is not a part of the string in the illustration, but is provided for illustration purposes as an index for the string.

Figure 6:
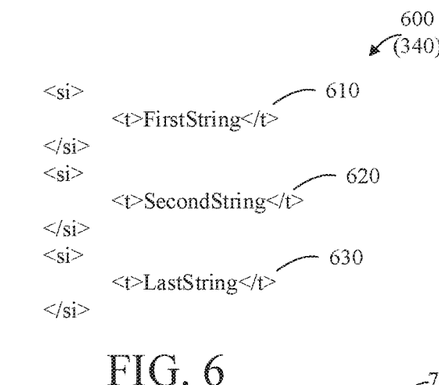
FIG. 6 is an illustrative XML file format for the shared strings table.

In operation 420, an indexed sequential string file (FIG. 7 700) is created by iterating through the shared strings file 340. FIG. 6 illustrates a portion of the XML file containing the shared strings table 600, 340, where <si></si> represents a string index and <t></t> represents the string text. The first 610, second 620, and last 630 strings are shown, separated by the defined XML delimiters.

As each string is obtained, it is written to the indexed sequential string file 700, which is preferably a single disk file (although other file structures could be utilized, including those with multiple files). In FIG. 7, only the bottom row illustrated is actually written to the disk—the top two rows are byte indexes shown solely for illustrative purposes. When the strings are written to the disk, information about them is maintained—namely, the string index number (the first string is index zero, the second string is index is one, etc.), its starting position as a byte offset within the file, and the byte length (either a "string length" or a "byte length" may be utilized. However, a "byte length" is preferable to better support international languages where a character can take more than one byte. These values may be stored in a string index table 800. The string index table 800 will generally not be huge, and thus, in order to keep the design simple, it may be stored in memory in a way illustrated by example in FIG. 8. However, in an implementation, the string index table 800 could be kept on disk as well, but would require the use of an additional (primary) index to find the first index data in such an on-disk "secondary" index of the string index table 800. This latter approach could be utilized in the event that the string index table 800 is determined to consume to much memory. In an implementation, the zip-formatted XLSX file's bytes are streamed, iterating from one file to another.

Using the illustrated example, when the first string 610 from the string table 600 is accessed, it is presumed to have a string index of zero. The string "FirstString" is read and is subsequently written to the next sequential spot in the sequential string file 700. Since this is the initial string read, it is located at the start of the file. The string is determined to be eleven bytes long, and thus, its entry in the string index table 800 indicates that string index zero has a byte offset within the file of zero (first string in the file), and has a length of eleven bytes.

Next, when the second string 620 from the string table is accessed, it is presumed to have a string index of one. The string "SecondString" is read and is subsequently written to the next sequential spot in the sequential string file 700. This string immediately follows the previous string. The string is determined to be twelve bytes long, and thus, its entry in the string index table 800 indicates that string index one has a byte offset within the file of eleven (immediately following the first string), and has a length of twelve bytes.

Finally, the last string 630 from the string table is accessed, and it is presumed to have a string index of two. The string "LastString" is read and is subsequently written to the next sequential spot in the sequential string file 700. As before, this string immediately follows the previous string. The string is determined to be ten bytes long, and thus, its entry in the string index table 800 indicates that string index two has a byte offset within the file of twenty-three (immediately following the second string), and has a length of ten bytes.

Once the entire shared strings table 600, 340 has been processed, all shared strings in the table have been written into the sequential string file 700 and a complete table of each string's index, byte position in the file, and length is stored in the string index table 800. This is in contrast to the solution in which all shared strings in the table are written into memory and take up considerable valuable memory space. According to an implementation, the library that is streaming the XLSX file puts the shared strings in a list/bag for later use, and the solution described herein may utilize this library with a bag implementation, which is disk based.

Subsequent operations on the worksheet are performed in the process operations subsequent to operation 420. When a call is made to the library to retrieve a cell value (which may be a part of displaying a spreadsheet or performing other operations), the worksheet structure files are accessed 430. When a cell contains a reference to a shared string, e.g., in FIG. 5, cell B:1 references the shared string "SecondString," this cell reference will contain the relevant string index (in this case, one), which can be used to retrieve the string contents. A call to the disk-based retrieval routine to access the indexed string data by its index 440 results in the routine looking up the string index in the string index table 800, accessing the sequential string file 700 at the byte offset (here, eleven) identified in the string index table 800 that is associated with that string index, and then reading the "length" number of bytes (here, twelve) as the string. The access can be a part of a processing of the entire table or it can be part of a processing or accessing of a partial table, including a single cell. The routines for reading data at a file offset for a prescribed number of bytes are known to those of skill in the art. Although a single cell can be read/retrieved and output in this manner, a series of such access can be utilized to wholly or partially recreate a worksheet or a workbook 450. Outputting a cell or cells may include transforming the raw retrieved data and formatting it into a format suitable for storage in memory or display on a display device.

Accessing the disk is slower than accessing memory. However, tests run using the alternative approaches suggest that operations taking on the order of several minutes to complete are lengthened by only five or six seconds using the disk-based approach. In many instances, this minimal trade-off in speed for a significant trade-off in memory reduction favors use of the disk-based approach described herein.

All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "including," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for accessing contents of a worksheet file, comprising:
   a processor;
   a non-volatile hardware disk device accessible by the processor and storing the worksheet file; and
   a memory accessible by the processor and comprising a worksheet processing module;
   wherein:
   the worksheet file comprises:
      a worksheet structure file that includes shared string identifiers for one or more cells of the worksheet file; and
      a shared strings table file that contains a plurality of shared strings associated with the one or more cells of the worksheet file; and
   the worksheet processing module comprises instructions that:
      process the shared strings table file by executing instructions that:
         open the shared strings table file;
         write each of the plurality of shared strings of the shared strings table file to an indexed shared string text file on the non-volatile hardware disk device; and
         for each of the plurality of shared strings, create an access record in an access table in memory, wherein each access record comprises: a shared string identifier, a starting offset into the indexed shared string text file, and a length; and
      retrieve data for a requested cell by executing instructions that:
         obtain a requested cell shared string identifier for the requested cell from the worksheet structure file;
         locate a requested cell access record in the access table based on the requested cell shared string identifier; and
         retrieve a requested cell string from the indexed shared string text file at a position indicated by the starting offset of the requested cell access record and for the length indicated by the requested cell access record; and
         output the retrieved requested cell string as the data for the requested cell.

2. The apparatus of claim 1, wherein the worksheet file is an XML-formatted spreadsheet file.

3. The apparatus of claim 2, wherein the formatted spreadsheet file is an Office Open eXtensible Markup Language (OOXML) formatted file.

4. The apparatus of claim 1, wherein data from the indexed shared string text file is streamed by making a plurality of sequential requests to retrieve data for a plurality of requested cells after processing the shared strings table file.

5. The apparatus of claim 1, wherein, to output the retrieved requested cell string, the worksheet processing module comprises instructions that format the retrieved requested cell string into a form that is displayable on a display device.

6. The apparatus of claim 1, wherein the non-volatile hardware disk device comprises a hard disk drive, a flash drive, or a solid-state disk drive.

7. A method for accessing contents of a worksheet file stored on a non-volatile hardware disk device,
   wherein the worksheet file comprises:
      a worksheet structure file that includes shared string identifiers for one or more cells of the worksheet file;
      a shared strings table file that contains a plurality of shared strings associated with the one or more cells of the worksheet file; and
   the method comprising:
   processing the shared strings table file by:
      opening the shared strings table file;
      writing each of the plurality of shared strings of the share string table file to an indexed shared string text file on the non-volatile hardware disk device; and
      for each of the plurality of shared strings, creating an access record in an access table in a volatile memory, wherein each access record comprises: a shared string identifier, a starting offset into the indexed shared string text file, and a length; and
   retrieving data for a requested cell by:
      obtaining a requested cell shared string identifier from the worksheet structure file for the requested cell;
      locating a requested cell access record in the access table based on the requested cell shared string identifier;
      retrieving a requested cell string from the indexed shared string text file at a position indicated by the starting offset of the requested cell access record and for the length indicated by the requested cell access record; and
      outputting the retrieved requested cell string as the data for the requested cell.

8. The method of claim 7, wherein the workbook file is an XML-formatted spreadsheet file.

9. The method of claim 8, wherein the workbook file is an Office Open eXtensible Markup Language (OOXML) formatted file.

10. The method of claim 7, wherein data from the indexed shared string text file is streamed by making a plurality of sequential requests to retrieve data for a plurality of requested cells after processing the shared strings table file.

11. The method of claim 7, wherein outputting the retrieved requested cell string comprises formatting the retrieved requested cell string into a form that is displayable on a display device.

12. The method of claim 7, wherein the non-volatile hardware disk device comprises a hard disk drive, a flash drive, or a solid-state disk drive.

13. A non-transitory computer-readable storage medium, comprising executable instructions that, when executed by a processor, facilitate performance of operations for accessing contents of a worksheet file stored on a non-volatile hardware disk device, wherein the worksheet file comprises:
   a worksheet structure file that includes shared string identifiers for one or more cells of the worksheet file;
   a shared strings table file that contains a plurality of shared strings associated with the one or more cells of the worksheet file; and the operations comprising:
processing the shared strings table file by:
  opening the shared strings table file;
  writing each of the plurality of shared strings to an indexed shared string text file on the non-volatile hardware disk device; and
  for each of the plurality of shared strings, creating an access record in an access table in a volatile memory, wherein each access record comprises: a shared string identifier, a starting offset into the indexed shared string text file, and a length; and
retrieving data for a requested cell by:
  obtaining a requested cell shared string identifier from the worksheet structure file for the requested cell;
  locating a requested cell access record in the access table based on the requested cell shared string identifier;
  retrieving a requested cell string from the indexed shared string text file at a position indicated by the starting offset of the requested cell access record and for the length indicated by the requested cell access record; and
  outputting the retrieved requested cell string as the data for the requested cell.

14. The non-transitory computer-readable storage medium of claim 13, wherein the worksheet file is an XML-formatted spreadsheet file.

15. The non-transitory computer-readable storage medium of claim 14, wherein the worksheet file is an Office Open eXtensible Markup Language (OOXML) formatted file.

16. The non-transitory computer-readable storage medium of claim 13, wherein data from the indexed shared string text file is streamed by making a plurality of sequential requests to retrieve data for a plurality of requested cells after processing the shared strings table file.

17. The non-transitory computer-readable storage medium of claim 13, wherein each of the plurality of share strings is written sequentially to the indexed shared string text file while processing the shared strings table file.

18. The non-transitory computer-readable storage medium of claim 13, wherein the non-volatile hardware disk device comprises a hard disk drive, a flash drive, or a solid-state disk drive.

* * * * *